(12) United States Patent
Geada et al.

(10) Patent No.: US 12,307,182 B2
(45) Date of Patent: *May 20, 2025

(54) VOLTAGE IMPACTS ON DELAYS FOR TIMING SIMULATION

(71) Applicant: ANSYS, INC., Canonsburg, PA (US)

(72) Inventors: Joao Geada, Chelmsford, MA (US); Nicholas Lee Rethman, North Andover, MA (US)

(73) Assignee: ANSYS, INC., Canonsburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,639

(22) Filed: Feb. 12, 2024

(65) Prior Publication Data

US 2024/0249055 A1    Jul. 25, 2024

Related U.S. Application Data

(63) Continuation of application No. 17/645,882, filed on Dec. 23, 2021, now Pat. No. 11,934,760.

(51) Int. Cl.
*G06F 30/367* (2020.01)
*G06F 30/3312* (2020.01)
*G06F 30/3315* (2020.01)
*G06F 30/38* (2020.01)
*G06F 119/12* (2020.01)

(52) U.S. Cl.
CPC ........ *G06F 30/367* (2020.01); *G06F 30/3312* (2020.01); *G06F 30/3315* (2020.01); *G06F 30/38* (2020.01); *G06F 2119/12* (2020.01)

(58) Field of Classification Search
None
See application file for complete search history.

(56) References Cited

U.S. PATENT DOCUMENTS

| 6,158,022 A | 12/2000 | Avidan |
| 10,430,537 B2 | 10/2019 | Jung |

*Primary Examiner* — Leigh M Garbowski
(74) *Attorney, Agent, or Firm* — WOMBLE BOND DICKINSON (US) LLP

(57) ABSTRACT

Methods and systems for performing timing analysis during the design of a circuit are described. In one embodiment, a simulation system can generate an effective resistance value (or an impedance value based on the effective resistance value) for an instance and use the effective resistance value in a simulation to determine a minimum timing delay for the instance when only the instance switches during such simulations.

22 Claims, 6 Drawing Sheets

---

RECEIVE DATA ABOUT DESIGN OF A CIRCUIT (E.G., AN IC CONTAINING A POWER GRID AND LOGIC INSTANCES COUPLED TO THE POWER GRID) — 51

COMPUTE AN EFFECTIVE RESISTANCE (OR IMPEDANCE) BETWEEN A FIRST VOLTAGE SUPPLY PIN (E.G. $V_{dd}$ OR $V_{ss}$) OF EACH INSTANCE, IN A SET OF INSTANCES, IN THE CIRCUIT, AND A FIRST SET OF POWER SUPPLY SOURCES (E.G., PINS IN THE $V_{dd}$ POWER GRID NEAR EACH INSTANCE) — 53

ADD, FOR EACH INSTANCE, THE COMPUTED EFFECTIVE RESISTANCE INTO THE CIRCUIT FOR THE INSTANCE — 55

DETERMINE A MINIMUM TIMING DELAY FOR THE INSTANCE BASED ON THE ADDED EFFECTIVE RESISTANCE IN A TIMING SIMULATION — 59

VOLTAGE IMPACTS ON DELAYS FOR TIMING SIMULATION

CROSS-REFERENCE TO RELATED APPLICATION

The present application is a continuation of U.S. patent application Ser. No. 17/645,882, filed Dec. 23, 2021, entitled "VOLTAGE IMPACTS ON DELAYS FOR TIMING SIMULATION," which is hereby incorporated by reference in its entirety.

BACKGROUND

This disclosure is related to the field of systems and methods for designing circuits, such as integrated circuits (ICs). In particular, this disclosure relates to systems and methods for designing circuits by using timing simulations and analysis to ensure the circuit, as designed, will operate in a manner that will satisfy desired performance goals.

Dynamic voltage drop analysis is often done to simulate how a power grid or power distribution network in an integrated circuit will perform when data and clock signals switch or toggle between voltage states, such as from high to low states, etc. Often, this switching can cause circuits to consume more power than when the circuit is idle (and therefore there is little switching). This increased power consumption can cause the power grid to deliver less than desired levels of voltage at one or more nodes or pins in the circuit, and this lowered level of voltage can affect the operation of logic circuits to the extent that the logic circuits may not operate correctly or as desired.

Thus, circuit designers often use simulation software to perform dynamic voltage drop analysis before they finish the design of an electrical circuit. Dynamic voltage drop (DVD) analysis typically involves simulating the repeated change over time of various data signals to simulate normal operation of the circuit (in which it is expected that the various data signals will change over time due to the normal operation of the circuit). Switching by aggressor cells can produce voltage drops at power supply rails of a victim cell, and this can cause the delay of victim output signals to change because of the voltage drops. This delay shifts the signals in time which can delay signals downstream from the victim cell. In effect, the switching by the aggressor cells create power supply noise at the victim which in turn delays an output from the victim cell. Multiple aggressors can attack a victim cell at the same time, which will increase the voltage drop and therefor increase the victim cell delay. The worst combination of the aggressors are used to produce the maximum timing delay for the victim cell. When only the victim cell switches, this act of switching will also cause a voltage drop on the voltage supply pins of the victim cell which will delay the output of a signal from the victim cell; this timing delay caused by only the victim cell's switching can be referred to as a minimum timing delay. Traditional timing analysis tools attempt to model this noise (if they perform a modeling of noise) by computing minimum and maximum timing delays through each instance of logic in a circuit.

Existing static timing analysis (STA) tools require both minimum timing delays and maximum timing delays when calculating timing violations such as setup and hold violations. The voltages used to calculate these timing delays are obtained from data from voltage drop analysis tools. Existing voltage drop ("IR") analysis tools do not accurately estimate voltage drops for purposes of computing simulated minimum timing delays at the output of an instance when the instance switches. These minimum timing delays occur when only the instance itself (and not its neighbor instances) is switching. These existing IR tools use either the ideal supply voltage at the instance when determining the minimum timing delay (thus ignoring any voltage drop when only the instance switches) or the supply voltage with the minimum degradation seen across the entire simulation. This means the minimum timing delay is either optimistic (when the ideal supply voltage is used) or potentially pessimistic (when the supply voltage with the minimum degradation seen across the entire simulation is used as it can include IR drop caused by unrelated activity). Traditional voltage drop simulations do not attempt to separate out the self-switching impact of voltage drop from the impacts of other switching activity (caused by aggressors that surround the victim cell).

SUMMARY OF THE DESCRIPTION

Methods and systems for performing timing analysis during the design of a circuit are described. In one embodiment, a simulation system can generate an effective resistance value (or an impedance value based on the effective resistance value) for an instance and use the effective resistance value in a simulation to determine a minimum timing delay for the instance when only the instance switches during such simulations.

A method, performed by a simulation system according to one embodiment, can include the following operations: receiving a design of circuit; computing a first effective resistance between a first voltage supply pin of an instance in the circuit and a first set of one or more power supply sources in the circuit containing the instance; adding the first effective resistance into the design to determine timing delay when only the instance switches; and determining a minimum timing delay for the instance based on the added first effective resistance. In one embodiment, the method can further include the operations: computing a second effective resistance between a second voltage supply pin of the instance and a second set of one or more power supply sources in the circuit; adding the second effective resistance into the design to determine timing delay when only the instance switches; and determining the minimum timing delay for the instance based on the added first effective resistance and based on the added second effective resistance. In one embodiment, the first voltage supply pin receives a voltage supply based on, for example, Vdd in the circuit and the second voltage supply pin receives a voltage supply based on, for example, Vss in the circuit. Instances with multiple supply pins, such as level shifters, can have an effective resistance per supply pin. In one embodiment, the method can further include one or more of the operations: performing a static timing analysis for the circuit based on the minimum timing delay for the instance; determining a maximum timing delay for the instance based on data about the design; and performing a static timing analysis on the design of the circuit based on a determined maximum timing delay for the instance. In one embodiment, the method can use impedances instead of resistances when determining a minimum timing delay (e.g., the first effective resistance is computed as part of computing an impedance which is used in place of merely a resistance). In one embodiment, the first effective resistance is computed by a simulation tool based on data about the design, and the simulation tool passes the first effective resistance to a static timing analysis tool. In one embodiment, the first effective resistance produces a non-ideal voltage at the first voltage supply pin, and the non-ideal voltage is less than an ideal voltage set for the design (e.g., the voltage drop at the instance's Vdd supply pin is less than Vdd). In one embodiment, the first set of power supply sources comprise points or nodes within a power supply grid in the design.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be considered a simulation system.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
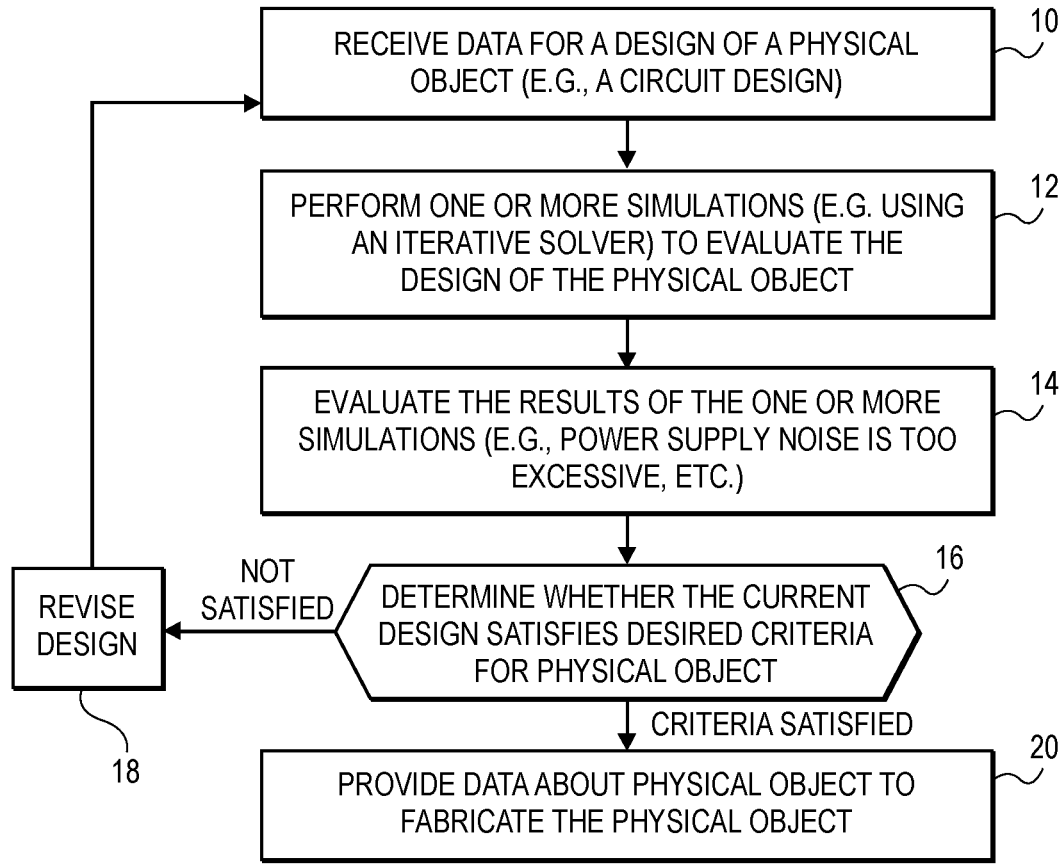
FIG. 1 shows a flowchart which illustrates a method which can be used according to one or more embodiments described herein to design an integrated circuit (IC) and simulate the properties (e.g., signal delays due to power supply noise) of the system prior to fabricating the IC.

The embodiments described herein can be used in simulations of electrical circuits (for example, an IC) in order to determine whether a particular design of the IC satisfies particular requirements for the circuit or system containing the circuit. For example, there might be certain design requirements relating to a power distribution network or other portions in the IC. FIG. 1 shows a method in which these design requirements can be tested relative to a particular design of an IC which is being simulated. In operation 10 of FIG. 1, a data processing system (e.g., a computer executing simulation software to provide a simulation system) can receive data about a design for a particular IC package or other electrical circuit. The data can be created in CAD (computer aided design) software on a data processing system, and the data can include cell library information, other timing information and information about the geometry of the IC, pins and nets in the IC and information about the materials in the conductors and dielectrics (e.g., silicon dioxide, etc.) and sizes of the conductors and dielectrics, etc. Then in operation 12, the data processing system can perform one or more simulations (such as simulations based on physical models of the IC package and PCB) to evaluate the design of the IC by determining, for example, dynamic voltage drop values in the IC. These simulations can use the aspects and embodiments described herein. In operation 14, the designer can evaluate the results of one or more simulations to determine whether the design of the IC satisfies certain desired criteria for the design. This determination is shown in operation 16. If the one or more criteria is satisfied, then the designer in operation 20 can provide data about the circuit to allow the fabrication or manufacture of the IC or system. For example, if the one or more criteria are satisfied, a CAD file can be produced that describes how to build the IC or system. If the criteria are not satisfied as determined in operation 16, the designer can revise the design in operation 18 (for example, by changing sizes and/or quantity of the power distribution network in the IC or moving conductors in the design, etc.) and repeat the process by performing additional further simulations to evaluate the redesigned circuit. This can be repeated until the desired criteria are achieved for the circuit.

The embodiments in this disclosure can be employed to simulate an IC that includes a power distribution network or grid of conductors that distribute power through the IC to various instances or cells (e.g., logic instances such as buffers, inverters, clocked registers, AND gates, OR gates, NAND gates, XOR gates etc.) in the IC. Each of the instances is powered by at least two voltage supply pins; one voltage supply pin can supply a positive voltage (e.g. Vdd) and another voltage pin can supply another voltage, such as ground (e.g., Vss). FIG. 4A shows an example of such an arrangement. The instance 201 can be a conventional cell (e.g., a buffer, an inverter, an AND gate or an OR gate or other types cells known in the art) and includes one or more inputs 206 and provides at least one output, such as output 207. The instance 201 receives a Vdd voltage supply source 203 through a Vdd supply pin 201A and receives a Vss voltage supply 205 through a Vss supply pin 201B. The Vdd voltage supply source 203 and the Vss voltage supply source 205 represent the power supply sources which are often a node or point in an upper metal layer that is coupled to an external power supply (e.g., a battery); there can be many such sources dispersed over an upper layer of an IC. These sources 203 and 205 may the closest such sources for the instance 201 (e.g., the closest Vdd and Vss source nodes relative to instance 201 as illustrated in FIG. 3 which will be described below).

Figure 2A:
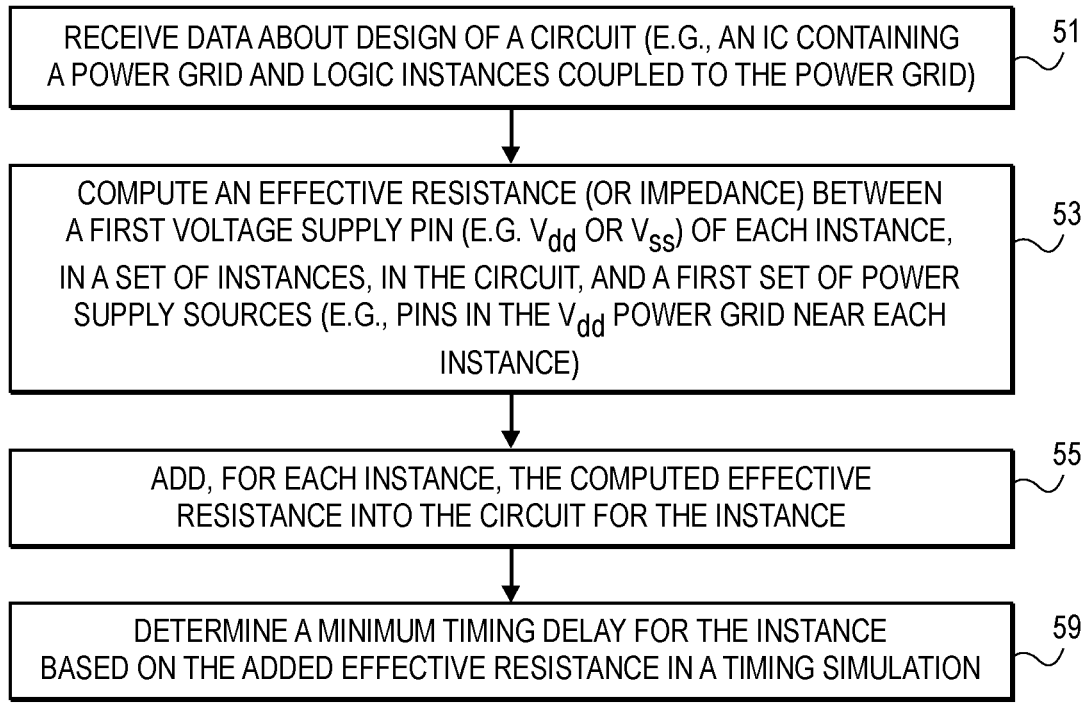
FIG. 2A shows a flowchart that depicts a method according to an embodiment described herein.

A method according to one embodiment will now be described while referring to FIG. 2A. This method can begin, in operation 51, by receiving information about the design of a circuit, such as an IC. This information can be conventional CAD data such as, library data about each instance in a library of instances, and this data can include information (e.g., length, width, thickness) about the conductors and dielectrics in the IC's power gird so that effective resistances can be calculated as described herein. These calculations, which are based on this conventional information, are known in the art. In operation 53, a simulation system can compute an effective resistance (or impedance which includes the effective resistance) between a voltage supply pin of an instance (e.g., a Vdd supply pin of the instance such as the pin 201A in FIG. 4A) and one or more local power supply sources for that voltage supply. FIG. 3 shows an example of how this computation can be performed based upon the local topology of the power grid and the instance.

Figure 3:
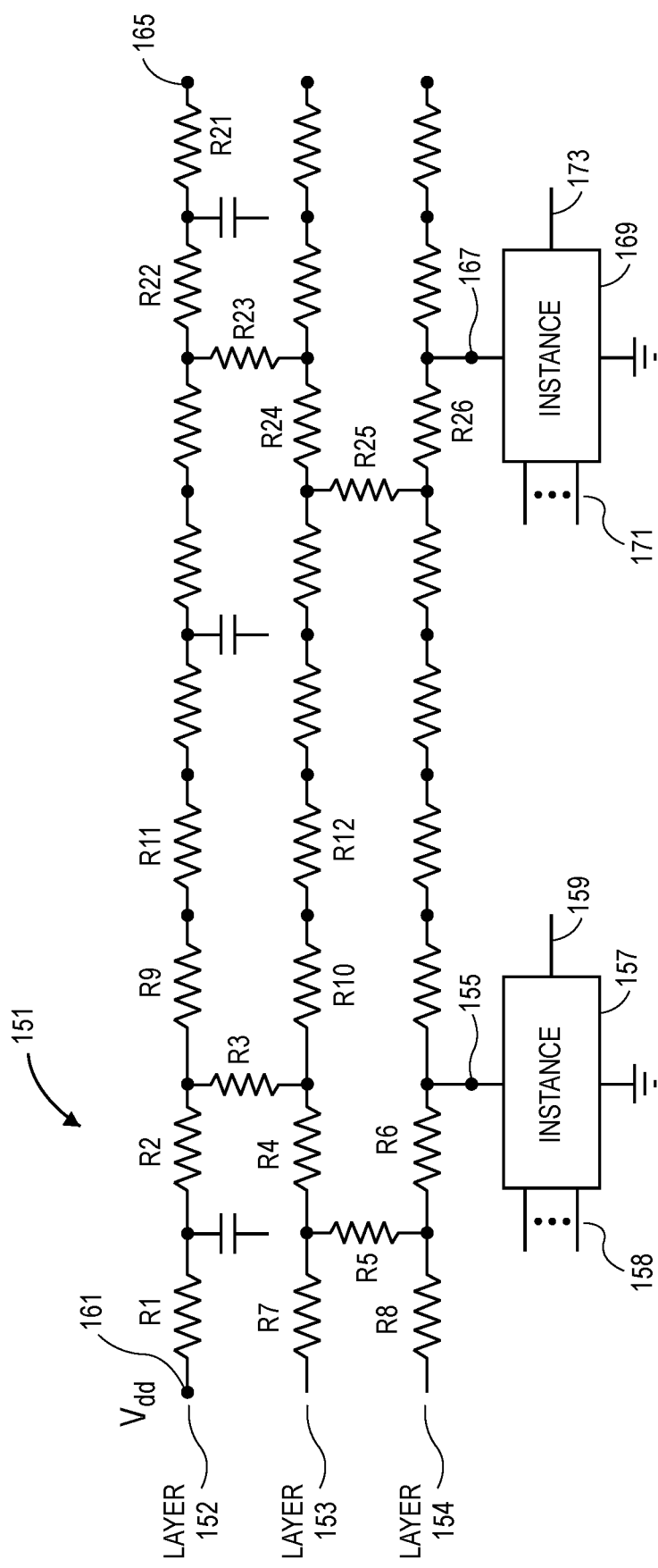
FIG. 3 shows a representation of the stacked conductive layers (e.g. metal layers) in a power grid in an IC, which power grid supplies power (e.g., Vdd and Vss) to logic instances in the IC.
Figure 4A:
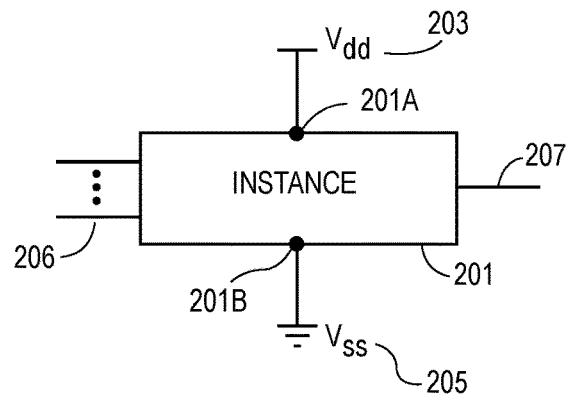
FIG. 4A shows an example of an instance (e.g., an AND gate or an OR gate, etc.) coupled to it voltage supply pins (Vdd and Vss in this example); these voltage supply pins are coupled to the power grid in an IC.
Figure 4B:
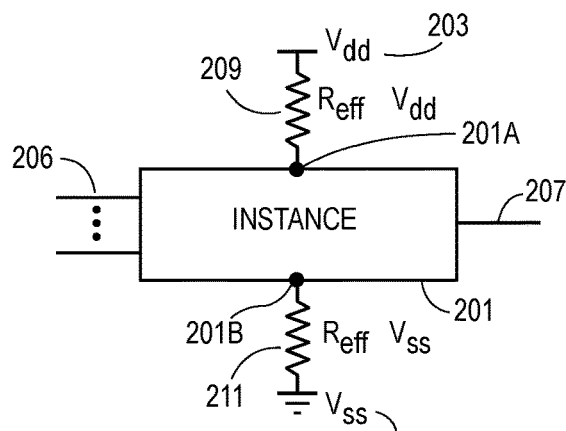
FIG. 4B shows an example of an instance after two effective resistances (Reff Vdd and Reff Vss) are computed and added into the circuit according to an embodiment described herein.

FIG. 3 shows a representation of an example of the stacked metal layers (or other conductive layers) in an IC's power grid; to keep the figure simple, only one power supply voltage (e.g., Vdd) is shown, but the IC will also include a similar power grid for the other power supply voltage (e.g., Vss) and each instance will also have a voltage supply pin to receive the other power supply voltage. The circuit 151 includes a power grid that includes the Vdd power grid formed by layers 152, 153, and 154; these layers represent stacked metal layers (or other conductors) in a three dimensional section of the IC containing the circuit 151. The resistances shown in FIG. 3 (e.g., R1, R2, . . . R26) are not intentional resistances in the power grid but rather are the inherent resistance present in a conductor. The top metal layer 152 is coupled by vias represented by resistors R3 and R23 to a middle metal layer 153; the middle metal layer 153 is coupled to the bottom metal layer 154 by vias represented by resistors R5 and R25. The top metal layer 152 is coupled to a Vdd supply source at two nodes; Vdd supply source 161 is a node that is coupled to the Vdd supply source (e.g., a bump on a top metal layer that is coupled to a Vdd bonding pad on the IC) and Vdd source 165 is another node coupled to a Vdd source. The instance 157 is coupled to the Vdd source 161 through the Vdd supply pin 155 that is local to the instance 157; the instance is also coupled to the Vss source (not shown) through a Vss supply pin that is local to the instance 157. The instance includes one or more inputs 158 and one or more outputs 159. The effective resistance (for Vdd path) for instance 157 can be computed, using a simplified approach that limits contributions from power sources and alternative paths, by adding the resistances R1, R2, R3, R4, R5, and R6 (Reff Vdd for instance 157=R1+R2+R3+R4+R5+R6) since this path through these resistances is the shortest path to the Vdd source (assuming that the other resistances along layer 152 are similar to R1 and R2). Thus the effective resistance Reff Vdd for instance 157 can be computed, using this simplified approach, as R1+R2+R3+R4+R5+R6 and added into the circuit for the instance 157. This is shown in FIG. 4B and in operation 55 of FIG. 2A. A more complex approach can employ techniques to compute the effective resistance to multiple voltage sources (e.g. sources 161 and 165) through multiple paths, although this level of complexity may not be necessary. The effective resistance Reff Vdd for instance 169 can be computed, using a simplified approach, as the sum of resistances R21, R22, R23, R24, R25, R26 and R27 (Reff Vdd for instance 169=R21+R22+R23+R24+R25+R26+R27); this effective resistance through this path of resistors is likely the shortest and lowest resistance path to the closest Vdd supply source for instance 169 (based on the view shown in FIG. 3). Similar computations for effective resistance to the Vss supply source can take a similar approach to produce Vss effective resistances for each instance.

Referring back to FIG. 2A, the method continues in operation 55 by adding all of the computed resistances into each instance in a set of instances in the circuit. FIG. 4B shows the result of this addition for the instance 201. As shown in FIG. 4B, the computed effective resistance 209 (Reff Vdd)) is added between the Vdd voltage supply source 203 and the Vdd voltage supply pin 201A and the computed effective resistance 211 (Reff Vss) is added between the Vss voltage supply source 205 and the Vss voltage supply pin 201B. These computed effective resistances will cause a voltage drop for the supply pins 201A and 201B for the instance 201 when only the instance 201 switches, and these computed effective resistances can be used in the modified instance when only the modified instance switches (with the added effective resistances as shown in FIG. 4B instead of the original instance shown in FIG. 4A). The voltage simulation system can pass to timing simulation systems the computed effective resistances to allow for the determination of minimum timing delays for each instance switching by itself. For example, in operation 59, a simulation system (e.g., a simulation system using static timing analysis simulation software) can use the computed effective resistances to determine the minimum timing delay for the instance based on the computed effective resistances which cause such voltage drop. These determined minimum timing delays are more accurate than the assumed minimum timing delays (based on no voltage drop) that were used in prior techniques.

Figure 2B:
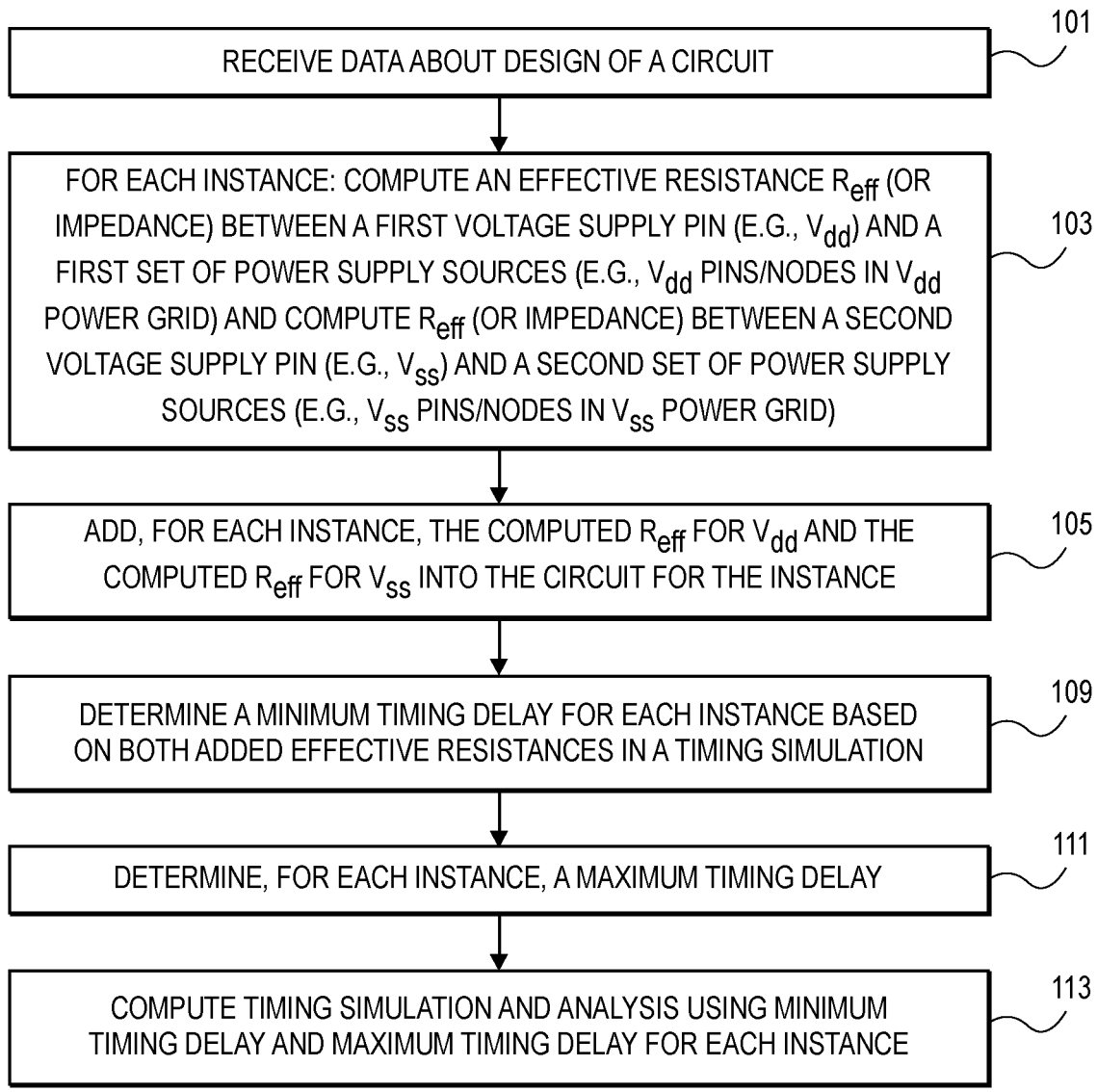
FIG. 2B shows another flowchart that illustrates a method according to another embodiment described herein.

A more detailed example of a method according to one embodiment is shown in FIG. 2B. This method can begin in operation 101, which is similar to operation 51 in FIG. 2A; in particular, in operation 101 a simulation system can receive conventional CAD design data about a circuit design, and this design data can be used to compute the effective resistances as described herein. This design data can be layout level data that is sufficient to compute the effective resistances based on geometry data about the conductors in the power grid of the circuit. In operation 103 a simulation system can, for each instance in the circuit (or a subset of such instances), compute effective resistances for both voltage supply pins (e.g., Reff Vdd and Reff Vss).

These computed effective resistances can then be added in operation 105 into the circuit of each instance, resulting in, for example, the added resistors 209 and 211 shown in FIG. 4B for each instance. These modified instances with their computed effective resistances can then be used in timing simulations or timing verifications to determine timing delays for each instance when only the instance switches based on the computed effective resistances for each instance. Information about these timing delays can be used in simulation systems (such as static timing analysis simulation or verification software) to perform timing simulations or timing verifications based on both the minimum timing delay for each instance and the maximum timing delay for each instance. In operation 109, a static timing analysis tool (e.g., timing analysis simulation software) can determine a minimum timing delay for each instance based on both added resistances at each instance when only the instance switches. Furthermore, the static timing analysis tool can also determine, in operation 111 for each instance, a maximum timing delay. Then in operation 113, the static timing analysis tool can compute a timing verification using, for each instance, the minimum timing delay (derived from the computed effective resistances) and the maximum timing delay. The maximum timing delay can be based upon dynamic voltage drop simulations that are known in the art.

Figure 4C:
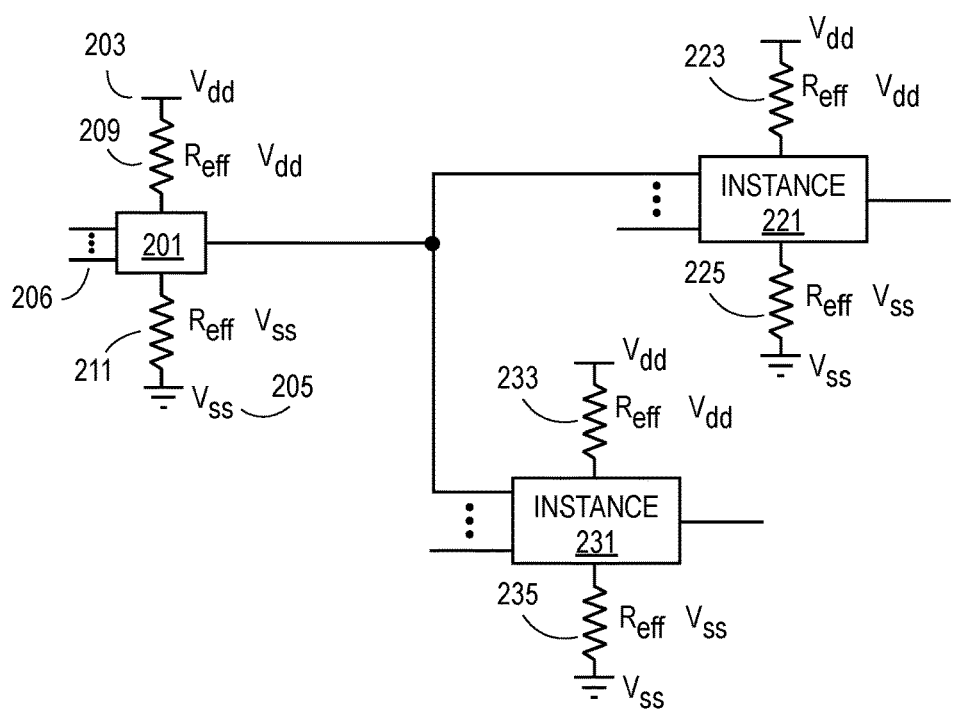
FIG. 4C shows an example of an embodiment in which each instance is processed to add computed effective resistances into the circuit.

In one embodiment, the method shown in FIG. 2B can be extended to include the effect of the added effective resistances on instances ("receivers") that receive outputs from a particular instance, so that the minimum timing delay of that particular instance takes into account the change in the load (at the output of the particular instance) as a result of the added effective resistances on these receivers. While the change in the load can be small, it can still effect the minimum timing delay of the particular instance. FIG. 4C shows an example of an instance 201 that has an output that drives instance 221 and instance 231. The methods described herein have been used to modify the circuit containing instance 221 so that it includes effective resistances 223 and 225 and to modify the circuit containing instance 231 so that it includes effective resistances 233 and 235. A simulation system can evaluate these added effective resistances in the instances 221 and 231 to determine the minimum timing delay for the instance 201. At least some of the embodiments described herein can create a voltage supply waveform at the voltage supply pins of an instance based on the computed Reff Vdd and Reff Vss values for each instance and the current drawn by each instance during switching events. This voltage supply waveform can be used to accurately model the timing behavior of each instance in both static timing analysis tools and also SPICE like simulation tools. This voltage supply waveform reflects the fact that the voltage at the supply pins of an instance change while the instance is switching; the voltages at the supply pins are not constant while the instance is switching. By adding Reff, in a simulation or analysis, a voltage supply waveform can be computed, and this waveform can be used to provide a more accurate assessment of the timing delays without requiring significant, computationally expensive, iterative SPICE like simulations and without requiring any attempt at aligning a waveform to the time that an input switches at the victim cell. Moreover, the embodiments described herein improve the operation of the computer that performs the methods because the computational cost of adding the effective resistances is small while the accuracy achieved is significant. In other words, the methods described herein can provide higher accuracy results while still using nearly the same amount of computational resources (e.g., processing time). Further, the methods avoid any requirement to align a waveform of the supply voltage to the time that an input switches at the victim cell, thereby improving the operation of the computer that performs these methods.

Figure 5:
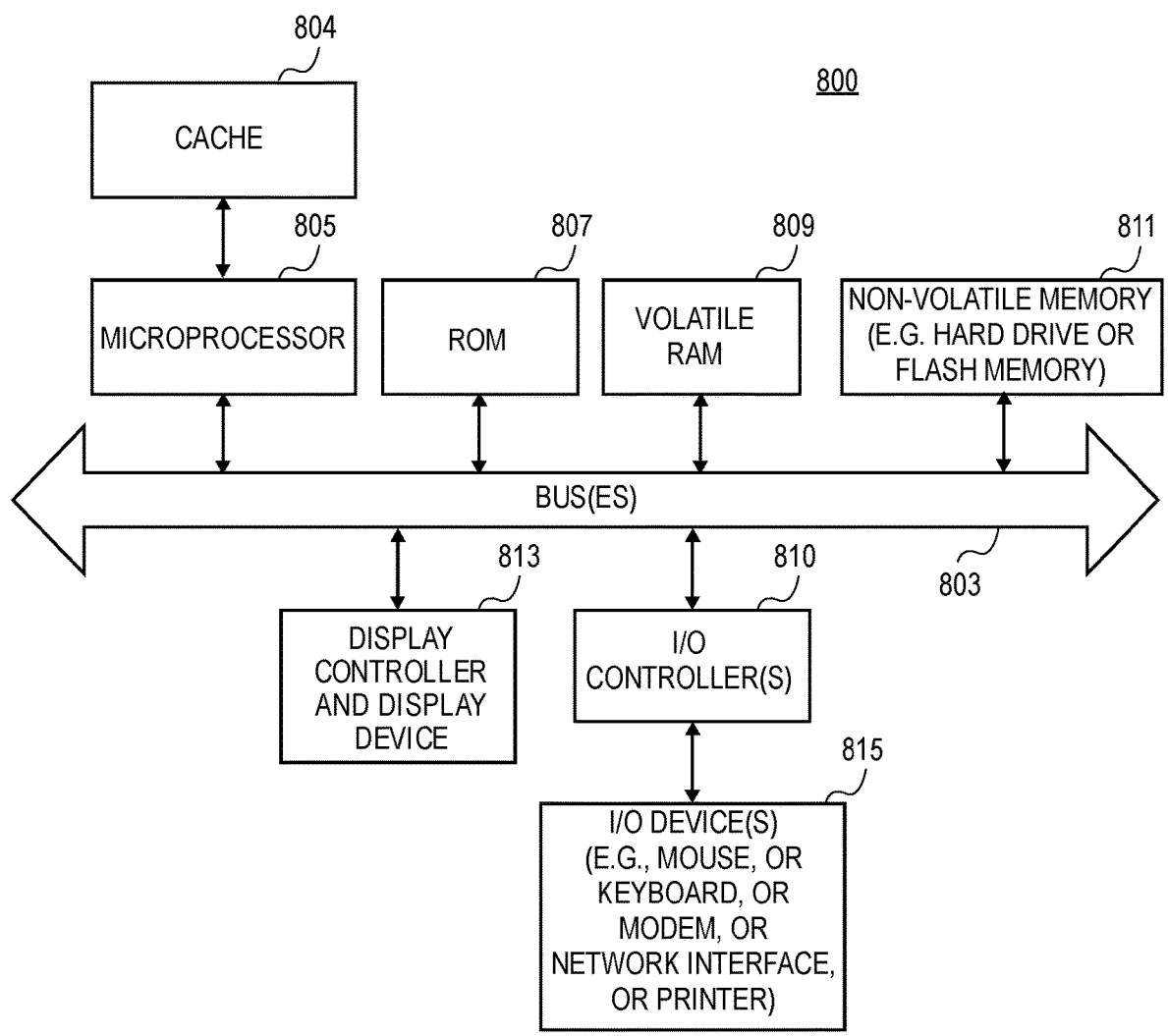
FIG. 5 shows an example of a data processing system that can perform one or more of the methods described herein and also be used to implement a simulation system that can perform one or more embodiments described herein.

FIG. 5 shows one example of a data processing system 800, which may be used with one embodiment. For example, the system 800 may be implemented to provide a system or device that performs any one of the methods described herein. Note that while FIG. 5 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 5, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 5 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A processor-performed integrated circuit design analysis method, comprising:
   receiving CAD (computer aided design) data for a design of a circuit, the CAD data having a plurality of instances of logic coupled to a power grid;
   computing an effective resistance in the power grid and coupled to an instance of logic in the design of the circuit; and
   performing a timing simulation for determining a minimum or maximum timing delay for the instance of logic switching by itself based on the effective resistance added to the instance of logic in the design of the circuit.

2. The method of claim 1, further comprising:
   performing a static timing analysis for the circuit based on the minimum timing delay for the instance.

3. The method of claim 1, further comprising:
   performing a static timing analysis on the design of the circuit based on the maximum timing delay for the instance.

4. The method of claim 1, wherein the effective resistance is computed as part of an impedance.

5. The method of claim 1, wherein the effective resistance is computed by a simulation tool based on data about the design, and the simulation tool passes the effective resistance to a static timing analysis tool.

6. A non-transitory machine-readable medium storing executable program instructions which when executed by a processing system cause the processing system to perform a method, the method comprising:
   receiving CAD (computer aided design) data for a design of a circuit, the CAD data having a plurality of instances of logic coupled to a power grid;
   computing an effective resistance in the power grid as coupled to an instance of logic in the design of the circuit; and
   performing a timing simulation for determining a minimum or maximum timing delay for the instance of logic switching by itself based on the effective resistance added to the instance of logic in the design of the circuit.

7. The non-transitory machine-readable medium of claim 6, wherein the method further comprises:
performing a static timing analysis for the circuit based on the minimum timing delay for the instance.

8. The non-transitory machine-readable medium of claim 6, wherein the method further comprises:
performing a static timing analysis on the design of the circuit based on the maximum timing delay for the instance.

9. The non-transitory machine-readable medium of claim 6, wherein the effective resistance is computed as part of an impedance.

10. The non-transitory machine-readable medium of claim 6, wherein the effective resistance is computed by a simulation tool based on data about the design, and the simulation tool passes the effective resistance to a static timing analysis tool.

11. A processor-performed integrated circuit design analysis method, comprising:
receiving CAD (computer aided design) data for a design of a circuit, the CAD data having a plurality of instances of logic coupled to a power grid;
computing an effective resistance in the power grid as coupled to a first instance of logic in the design of the circuit and coupled to a second instance of logic in the design of the circuit, the second instance of logic coupled to an output of the first instance of logic in the design of the circuit; and
performing a timing simulation to determine a minimum timing delay for the first instance of logic switching by itself based on a change of load of the second instance of logic in the design of the circuit and based on an effective resistance added to the first and second instances of logic in the design of the circuit.

12. The method of claim 11, further comprising:
performing a static timing analysis for the circuit based on the minimum timing delay for the first instance.

13. The method of claim 11, further comprising:
determining a maximum timing delay for the first instance based on data about the design.

14. The method of claim 13, wherein the method further comprises:
performing a static timing analysis on the design of the circuit based on the maximum timing delay for the first instance.

15. The method of claim 11, wherein the effective resistance is computed as part of an impedance.

16. The method of claim 11, wherein the effective resistance is computed by a simulation tool based on data about the design, and the simulation tool passes the effective resistance to a static timing analysis tool.

17. A non-transitory machine-readable medium storing executable program instructions which when executed by a processing system cause the processing system to perform a method, the method comprising:
receiving CAD (computer aided design) data for a design of a circuit, the CAD data having a plurality of instances of logic coupled to a power grid;
computing an effective resistance in the power grid as coupled to a first instance of logic in the design of the circuit and coupled to a second instance of logic in the design of the circuit, the second instance of logic coupled to an output of the first instance of logic in the design of the circuit; and
performing a timing simulation to determine a minimum timing delay for the first instance of logic switching by itself based on a change of load of the second instance of logic in the design of the circuit and based on an effective resistance added to the first and second instances of logic in the design of the circuit.

18. The non-transitory machine-readable medium of claim 17, wherein the method further comprises:
performing a static timing analysis for the circuit based on the minimum timing delay for the first instance.

19. The non-transitory machine-readable medium of claim 17, wherein the method further comprises:
determining a maximum timing delay for the first instance based on data about the design.

20. The non-transitory machine-readable medium of claim 19, wherein the method further comprises:
performing a static timing analysis on the design of the circuit based on the maximum timing delay for the first instance.

21. The non-transitory machine-readable medium of claim 17, wherein the effective resistance is computed as part of an impedance.

22. The non-transitory machine-readable medium of claim 17, wherein the effective resistance is computed by a simulation tool based on data about the design, and the simulation tool passes the effective resistance to a static timing analysis tool.

* * * * *